April 26, 1927.
R. J. HARRIS
FLYTRAP
Filed Jan. 23, 1926 2 Sheets-Sheet 1
1,626,530
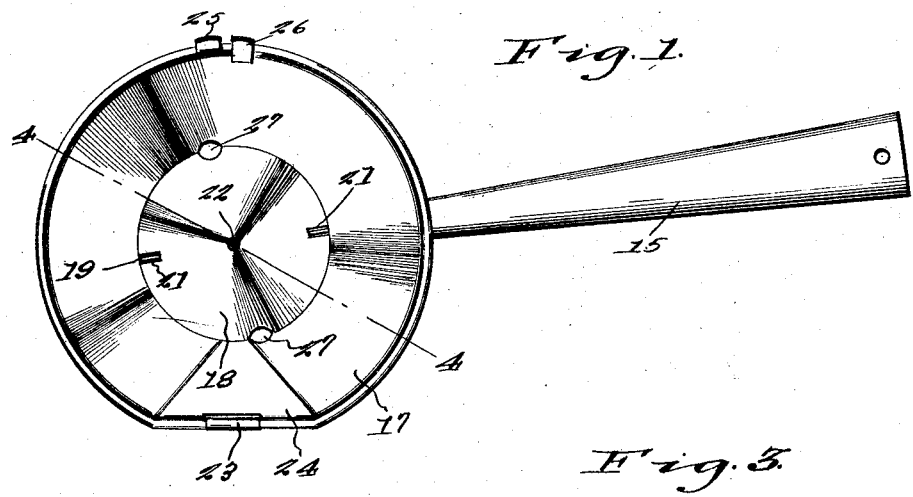
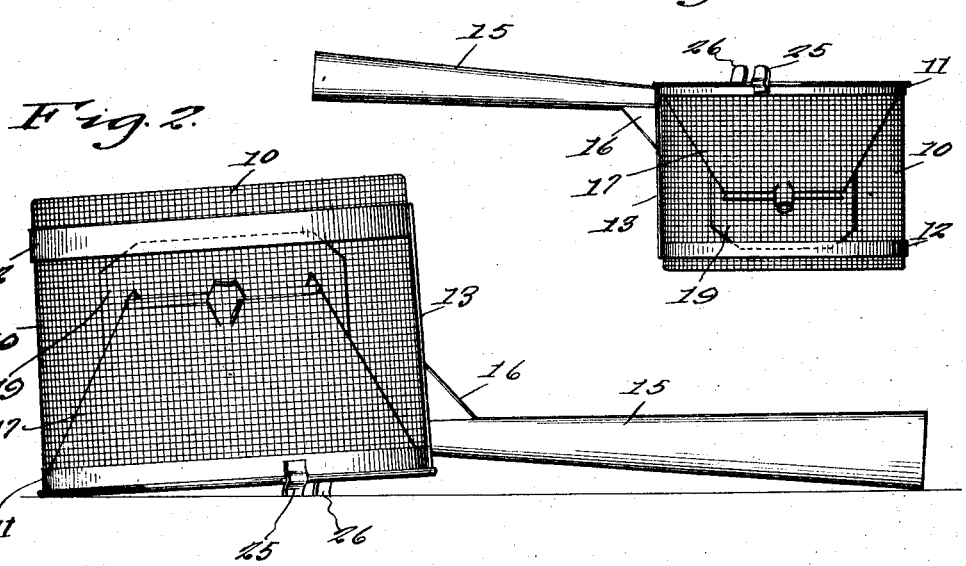
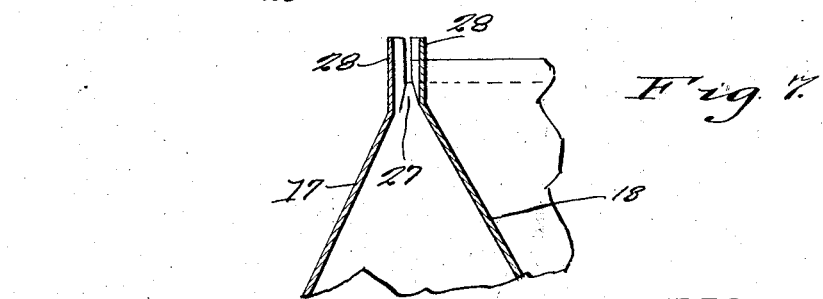
R. J. Harris INVENTOR
BY Victor J. Evans ATTORNEY
WITNESS:

April 26, 1927.  
R. J. HARRIS  
FLYTRAP  
Filed Jan. 23, 1926   2 Sheets-Sheet 2
1,626,530
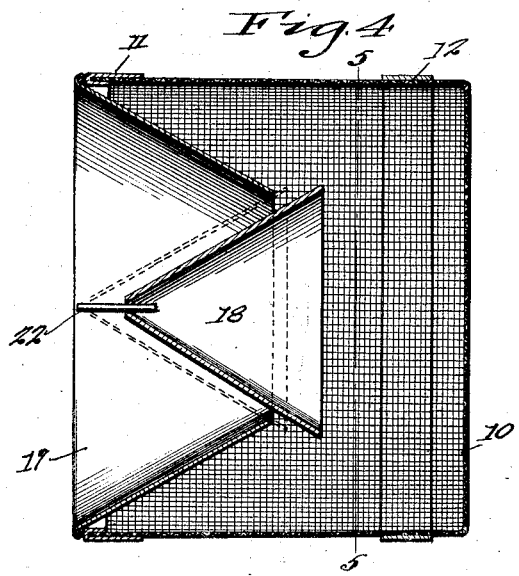
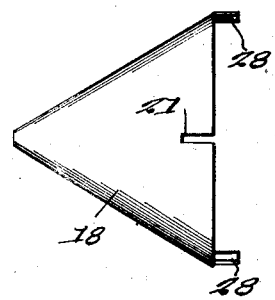
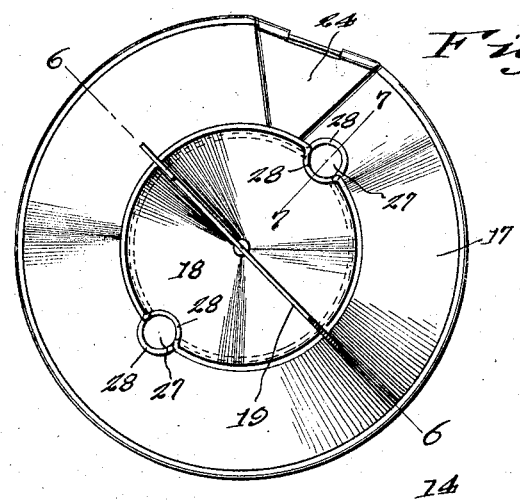
R. J. Harris
INVENTOR
BY Victor J. Evans
ATTORNEY Patented Apr. 26, 1927.

1,626,530

UNITED STATES PATENT OFFICE.

RAYMOND J. HARRIS, OF HOUSTON, TEXAS.

FLYTRAP.

Application filed January 23, 1926. Serial No. 83,271.

This invention relates to improvements in animal traps and is especially designed for catching flies and the like.

An object of the present invention is to provide a trap which will effectually capture insects when the trap is stationary, or which may be swung through the air to collect and capture insects located in its path of movement and prevent the escape of the insects after capture.

Another object of the invention is to provide novel means for automatically opening and closing the trap as the latter is swung through the air and to provide for the admission of insects when the invention is used as a stationary trap.

With the above and other objects in view, the invention further includes the following novel features and details of construction, to be hereinafter more fully described, illustrated in the accompanying drawings and pointed out in the appended claims.

In the drawings:—

Figure 1 is an elevation of a trap constructed in accordance with the invention.

Figure 2 is a side view of the trap illustrating its position when used as a stationary trap.

Figure 3 is an elevation showing the trap in a position reverse from that illustrated in Figure 2.

Figure 4 is an enlarged section on the line 4—4 of Figure 1.

Figure 5 is a section on the line 5—5 of Figure 4.

Figure 6 is a section on the line 6—6 of Figure 5.

Figure 7 is a section on the line 7—7 of Figure 5.

Figure 8 is a detail elevation of the movable closure member.

Figure 9 is an elevation showing a slightly modified form of the invention.

Referring in detail to the drawings wherein like characters of reference denote corresponding parts, the reference character 10 indicates a receptacle which is preferably made of woven wire and is reinforced by means of a frame. This frame may consist of spaced annular members 11 and 12 as shown in Figures 2, 3 and 4 of the drawings. In these figures the annular members are connected by a bar or strap 13.

In Figure 9 the frame is shown as comprising an annular member 11ª which has connected thereto the opposite ends of a strap 14, the latter extending entirely across the receptacle.

The receptacle is provided with a handle 15 whose inner end is connected to the ring 11, or 11ª and is also connected by means of a brace 16 with the strap 13, or the strap 14 as the case may be.

A receptacle is thus provided which is open at one face while extending inwardly from this opening is a hollow tapered member 17, preferably in the form of the frustum of a cone. This member 17 provides a tapered passage which extends into the receptacle and which is designed to be closed by a hollow tapered member 18, the latter being of conical formation.

Secured to the member 17 and extending across the inner open end thereof is a plate 19. This plate is provided with a projection 20 which extends into the member 18 and the latter is notched at its inner edge as shown at 21 to receive this plate. Secured to the projection 20 and extending from the restricted end of the member 18 is a pin 22. This pin provides a guide for one end of the member 18 while the opposite end of said member is guided by the plate 19, the latter also serving to prevent rotation of the member 18.

As thus far described, it will be seen that when the trap is swung through the air, the force of the air and the movement of the trap will act to move the member 18 to open position as shown in Figure 4 of the drawings. Insects in the path of movement of the trap will thus be deflected through the opening into the receptacle. The member 18 will be automatically closed at the end of movement.

The member 17 is hingedly secured to the ring 11 or 11ª, as shown at 23, the said member and ring being flattened as shown at 24. The ring has extending therefrom a resilient finger or catch 25, while a lug 26 extends from the adjacent edge of the member 17. The finger 25 engages over the edge of the member 17 and acts to hold the latter in position, while the lug 26 together with the extended portion of the finger 25 serves as a convenient means for releasing said member. In addition, the finger 25 and lug 26 serve as feed, and together with the handle 15 serve to space the trap above a surface or support so that insects may pass beneath and enter the trap when the latter is stationary, or in the position shown in Figure 2 of the drawings.

When in this position, the member 18 will be closed by gravity and in order to permit insects to enter the trap when in this position, the members 17 and 18 are provided with oppositely located depressions forming relatively small entrance openings 27. Lugs or projections 28 extend from these openings and form restricted entrance passages. This permits of the entrance of flies and roaches and prevents their escape, it being practically impossible for roaches to pass around the thin edges at the inner ends of these passages.

If desired a suitable bait receptacle may be located beneath the trap.

The invention is susceptible of various changes in its form, proportions and minor details of construction and the right is herein reserved to make such changes as properly fall within the scope of the appended claims.

Having described the invention what is claimed is:—

1. An insect trap comprising a receptacle having an entrance opening, a hollow tapered member extending inwardly from the opening and defining an entrance passage, a reversely tapered member movable within the passage to close the inner end thereof and cooperating means included in the hollow and reversely tapered members to provide relatively small openings when the passage is closed.

2. An insect trap comprising a receptacle having an entrance opening, a hollow tapered member extending inwardly from the opening and defining an entrance passage, a reversely tapered member movable within the passage to close the inner end thereof, a plate secured to and extending transversely across the inner end of the hollow tapered member and having a projection extending within the inner end of the reversely tapered member and said last mentioned member having notches to receive said plate and a guide pin extending from the projections through said reversely tapered member.

3. An insect trap comprising a receptacle having an entrance opening, a hollow tapered member extending inwardly from the opening and defining an entrance passage, a reversely tapered member movable within the passage to close the inner end thereof, means included in the hollow and reversely tapered members to provide relatively small openings when the passage is closed and projections extending through the adjacent edges of the tapered members around the relatively small openings to provide restricted passages extending into the receptacle.

4. An insect trap comprising a receptacle having an open face, a reinforcing frame extending around the open face, a reinforcing strip extending at right angles from the frame, a handle having its inner end secured to the frame and strip, a hollow tapered member removably positioned within the frame and extending into the receptacle, a member movable within the hollow tapered member to control the opening and combined means carried by the frame and hollow tapered member to hold the latter in place, facilitate removal of said member and provide spacing feet.

5. An insect trap comprising a receptacle having an open face, a reinforcing frame extending around the open face, a reinforcing strip extending at right angles from the frame, a handle having its inner end secured to the frame and strip, a hollow tapered member removably positioned within the frame and extending into the receptacle, a member movable within the hollow tapered member to control the opening, peripherally spaced projections carried by the frame and hollow tapered member to hold the latter in place, facilitate removal of said member and provide spacing feet.

6. An insect trap comprising a receptacle having an open face, a reinforcing frame including spaced rings and a bar connecting the rings, an elongated handle having its inner end secured to one of the rings and said bar and extending radially from the open face of the receptacle, a hollow tapered member removably positioned within the frame and extending into the receptacle, a member movable within the hollow tapered member to control the opening and means to hold the hollow tapered member in place.

In testimony whereof I affix my signature.

RAYMOND J. HARRIS.